(12) United States Patent
Ettridge et al.

(10) Patent No.: US 10,240,477 B2
(45) Date of Patent: Mar. 26, 2019

(54) TURBOFAN ENGINE WITH GENERATOR

(71) Applicant: GE AVIATION SYSTEMS LLC, Grand Rapids, MI (US)

(72) Inventors: David Graham Ettridge, Cheltenham (GB); Xiaochuan Jia, Vandalia, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 14/896,553

(22) PCT Filed: Jun. 7, 2013

(86) PCT No.: PCT/US2013/044702
§ 371 (c)(1),
(2) Date: Dec. 7, 2015

(87) PCT Pub. No.: WO2014/196981
PCT Pub. Date: Dec. 11, 2014

(65) Prior Publication Data
US 2016/0123174 A1    May 5, 2016

(51) Int. Cl.
*F01D 15/10*    (2006.01)
*F01D 11/04*    (2006.01)
(Continued)

(52) U.S. Cl.
CPC ............ *F01D 15/10* (2013.01); *F01D 5/06* (2013.01); *F01D 5/12* (2013.01); *F01D 5/147* (2013.01);
(Continued)

(58) Field of Classification Search
CPC .......... F01D 15/10; F01D 19/00; F01D 25/24; F01D 5/06; F01D 5/12; F01D 5/147;
(Continued)

(56) References Cited

U.S. PATENT DOCUMENTS 4,093,869 A    6/1978    Hoffmann et al.
4,367,413 A    1/1983    Nair
(Continued)

FOREIGN PATENT DOCUMENTS

CN    101205835 A    6/2008
CN    102347652 A    2/2012
(Continued)

OTHER PUBLICATIONS

Unofficial English translation of Chinese Office Action issued in connection with corresponding CN Application No. 201380077256.6 dated May 4, 2016.
(Continued)

*Primary Examiner* — Tulsidas C Patel
*Assistant Examiner* — Joseph Ortega
(74) *Attorney, Agent, or Firm* — Ge Aviation Systems LLC; William Andes

(57) ABSTRACT

A turbofan engine includes a turbine engine having a rotatable fan and a generator. The generator further includes a main machine, an exciter, and a generator control unit for controlling the excitation of the main machine. A rotor assembly is located within one of the blades, and a stator assembly that is along a rotational path of the rotor assembly whereby the operation of the turbine engine rotates the fan, which rotates the rotor assembly along its rotational path past the stator assembly to generate electricity.

20 Claims, 3 Drawing Sheets

(51) Int. Cl.
| | |
|---|---|
| F01D 25/24 | (2006.01) |
| F01D 5/06 | (2006.01) |
| F01D 5/12 | (2006.01) |
| F01D 5/14 | (2006.01) |
| F02K 3/06 | (2006.01) |
| F02C 7/275 | (2006.01) |
| F02N 11/04 | (2006.01) |
| F01D 19/00 | (2006.01) |

(52) U.S. Cl.
CPC ............ *F01D 19/00* (2013.01); *F01D 25/24* (2013.01); *F02C 7/275* (2013.01); *F02K 3/06* (2013.01); *F02N 11/04* (2013.01); *F05D 2220/36* (2013.01); *F05D 2220/76* (2013.01); *F05D 2220/766* (2013.01); *F05D 2240/20* (2013.01); *F05D 2260/40* (2013.01); *Y02T 50/671* (2013.01)

(58) Field of Classification Search
CPC . F02C 7/275; F02K 3/06; F02N 11/04; F05D 2220/76; F05D 2220/36; Y02T 50/671
See application file for complete search history.

(56) References Cited

U.S. PATENT DOCUMENTS

| | | | | |
|---|---|---|---|---|
| 4,927,329 | A * | 5/1990 | Kliman | F01D 7/00 416/127 |
| 5,281,094 | A * | 1/1994 | McCarty | B64C 11/44 318/722 |
| 5,546,742 | A * | 8/1996 | Shekhawat | F02N 11/04 290/31 |
| 5,899,411 | A * | 5/1999 | Latos | B64D 33/00 244/53 A |
| 6,832,486 | B2 | 12/2004 | Care et al. | |
| 7,400,056 | B2 * | 7/2008 | McGinley | F02C 7/268 290/31 |
| 7,952,244 | B2 * | 5/2011 | Colin | F01D 15/10 290/52 |
| 8,505,308 | B2 * | 8/2013 | Walitzki | F02C 7/268 60/772 |
| 9,038,399 | B2 * | 5/2015 | MacFarlane | F02C 7/14 60/782 |
| 9,143,023 | B1 * | 9/2015 | Uskert | H02K 16/00 |
| 9,194,330 | B2 * | 11/2015 | Wood | F02K 3/075 |
| 2004/0027077 | A1 * | 2/2004 | Xu | F02C 7/268 318/107 |
| 2004/0027078 | A1 * | 2/2004 | Xu | F02C 7/268 318/107 |
| 2005/0046398 | A1 | 3/2005 | Anghel et al. | |
| 2006/0254255 | A1 * | 11/2006 | Okai | B64D 27/24 60/226.1 |
| 2007/0159281 | A1 * | 7/2007 | Li | H02K 15/03 335/284 |
| 2007/0169462 | A1 | 7/2007 | Sharp et al. | |
| 2008/0017369 | A1 * | 1/2008 | Sarada | E21B 43/40 166/244.1 |
| 2008/0054739 | A1 | 3/2008 | Lueck | |
| 2008/0120980 | A1 | 5/2008 | Gemin et al. | |
| 2008/0150287 | A1 * | 6/2008 | Kern | F01D 15/10 290/52 |
| 2008/0238098 | A1 | 10/2008 | Becquerelle et al. | |
| 2008/0238202 | A1 * | 10/2008 | Kern | H02P 9/302 307/53 |
| 2008/0303490 | A1 * | 12/2008 | Xu | H02K 19/26 322/29 |
| 2009/0121688 | A1 * | 5/2009 | Lemmers | H02P 9/00 322/29 |
| 2009/0169386 | A1 * | 7/2009 | Suciu | F01D 5/30 416/189 |
| 2010/0126178 | A1 * | 5/2010 | Hyde | B64D 27/24 60/767 |
| 2010/0127496 | A1 * | 5/2010 | Burkholder | F01D 9/065 290/46 |
| 2010/0219779 | A1 * | 9/2010 | Bradbrook | F02C 3/113 318/153 |
| 2010/0295301 | A1 * | 11/2010 | Huang | F02N 11/04 290/31 |
| 2010/0308581 | A1 * | 12/2010 | Anghel | F02C 7/275 290/31 |
| 2011/0062710 | A1 * | 3/2011 | Anghel | F03D 9/002 290/44 |
| 2011/0252807 | A1 * | 10/2011 | Huang | B64D 41/00 60/788 |
| 2012/0025639 | A1 * | 2/2012 | Zywot | H02K 3/527 310/54 |
| 2012/0049523 | A1 * | 3/2012 | Bersiek | F03D 1/025 290/44 |
| 2012/0049531 | A1 * | 3/2012 | Bray | F03D 9/002 290/55 |
| 2012/0126542 | A1 * | 5/2012 | Deng | F03D 3/005 290/55 |
| 2012/0133150 | A1 * | 5/2012 | Dooley | F01D 15/10 290/1 A |
| 2012/0159964 | A1 * | 6/2012 | Huang | F02C 7/26 60/786 |
| 2012/0247847 | A1 * | 10/2012 | Schroeder | H01L 35/00 180/65.31 |
| 2012/0286516 | A1 * | 11/2012 | Chong | H02K 7/1823 290/52 |
| 2013/0081406 | A1 * | 4/2013 | Malmborg | F01D 5/066 60/805 |
| 2013/0088019 | A1 * | 4/2013 | Huang | H02P 9/00 290/1 C |
| 2013/0098058 | A1 * | 4/2013 | Sheridan | F02C 7/32 60/783 |
| 2013/0111920 | A1 * | 5/2013 | Hamrin | F02C 3/20 60/780 |
| 2013/0277976 | A1 * | 10/2013 | Koenig | H02K 16/02 290/52 |
| 2014/0246957 | A1 * | 9/2014 | Grosskopf | F16B 2/20 310/67 R |
| 2016/0130970 | A1 * | 5/2016 | Blazer | H02P 9/007 290/7 |
| 2016/0186590 | A1 * | 6/2016 | Himes | F01D 5/3015 416/183 |

FOREIGN PATENT DOCUMENTS

| | | |
|---|---|---|
| CN | 102857057 A | 1/2013 |
| JP | S55-123319 A | 9/1980 |
| JP | H10-196496 A | 7/1998 |
| JP | 2005098296 A | 4/2005 |
| JP | 2007-255233 A | 10/2007 |
| JP | 2008190526 A | 8/2008 |
| JP | 2012527863 A | 11/2012 |
| WO | 2005073519 A1 | 8/2005 |

OTHER PUBLICATIONS

International Search Report and Written Opinion dated Mar. 24, 2014 which was issued in connection with PCT Patent Application No. PCT/US2013/044702 which was filed on Jun. 7, 2013.

European Search & Opinion Report issued in connection with corresponding EP Application No. 13886178.6 dated Oct. 21, 2016.

Unofficial English Translation of Japanese Office Action issued in connection with corresponding JP Application No. 2016-518308 dated Nov. 29, 2016.

Office Action issued in connection with corresponding JP Application No. 2016-518308 dated Jul. 18, 2017.

* cited by examiner

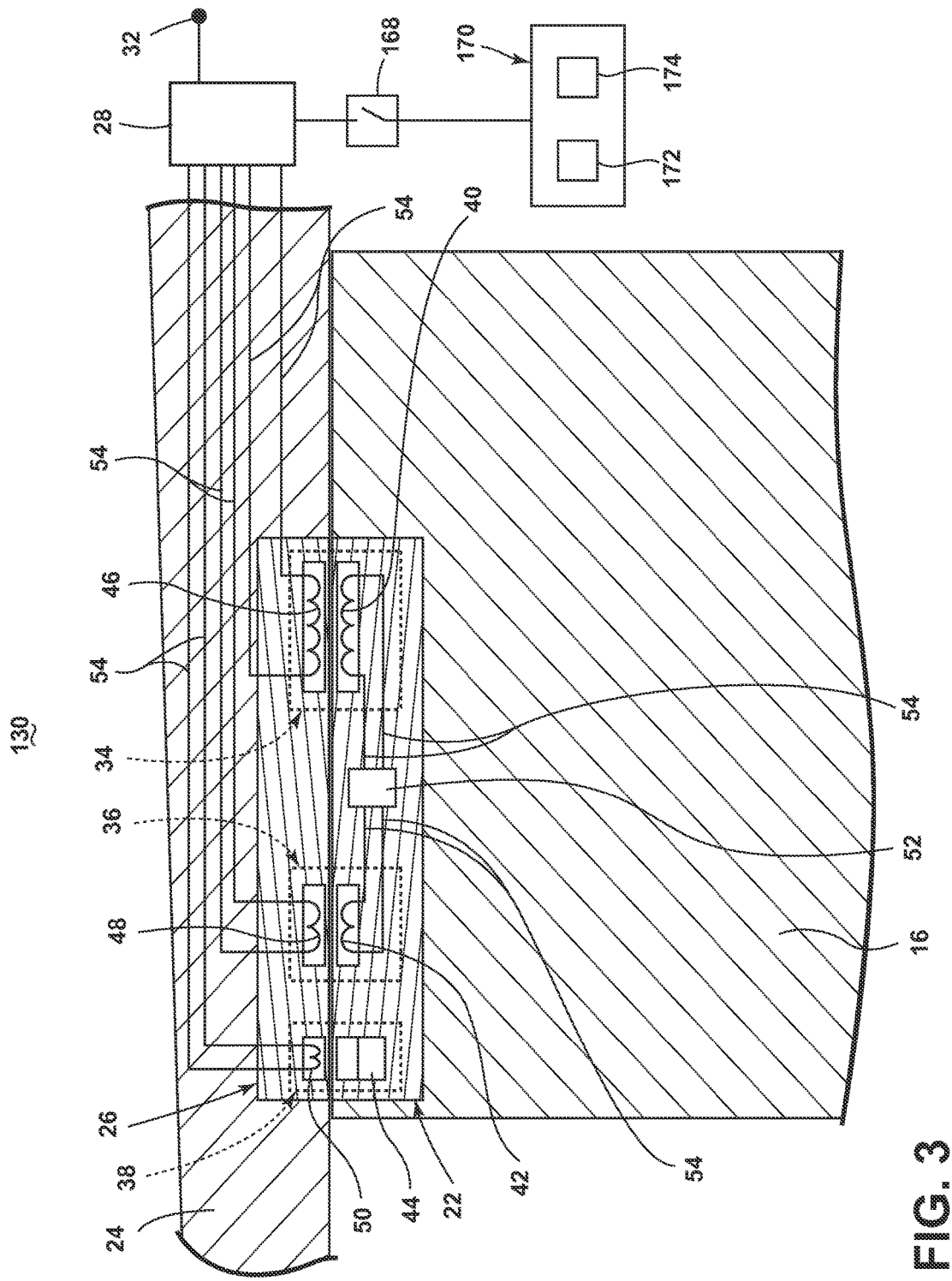

TURBOFAN ENGINE WITH GENERATOR

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines can have two or more spools, including a low pressure (LP) spool that provides a significant fraction of the overall propulsion system thrust, and a high pressure (HP) spool that drives one or more compressors and produces additional thrust by directing exhaust products in an aft direction.

Gas turbine engines may also use the mechanical power of one or more spools to power a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy needed to power accessories.

Generators extract mechanical power from the gas turbine engines to generate electricity for the aircraft by using pressure spools of the engines to rotate the generator rotor, and thus, generate electricity. An example generated electrical signal is 115 VAC at 400 Hz.

BRIEF DESCRIPTION OF THE INVENTION

In one aspect, a turbofan engine includes a turbine engine having a rotatable fan with a plurality of blades, a nacelle having a portion surrounding the blades, and a generator. The generator further includes a main machine having a main rotor winding and a main stator winding, an exciter having an exciter rotor winding and an exciter stator winding, a rectifier electrically coupling the exciter rotor winding to the main rotor winding, and a generator control unit (GCU) electrically coupled to the exciter stator winding and the main stator winding and controlling the excitation of the main machine by supplying electricity to the exciter stator winding. The main rotor winding and exciter rotor winding define a rotor assembly that is located within at least one of the blades, and the main stator winding and the exciter stator winding define a stator assembly that is fixedly located within the nacelle along a rotational path of the rotor assembly whereby the operation of the turbine engine rotates the fan, which rotates the rotor assembly along its rotational path past the stator assembly to generate electricity.

BRIEF DESCRIPTION OF THE DRAWINGS

In the drawings:

FIG. 3 is a schematic showing a starter/generator assembly in accordance with a second embodiment of the invention.

DESCRIPTION OF EMBODIMENTS OF THE INVENTION

While embodiments of the invention may be implemented in any environment using a gas turbine engine for generating electricity, it is currently contemplated to be implemented in a jet engine environment, where the generator is typically referred to as an electric motor or electric machine. Thus, a brief summary of the contemplated environment should aid in a more complete understanding. A gas turbine engine may be a variable-speed turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region to increase the velocity of the exhausted gases, and thereby increasing thrust.

Figure 1:
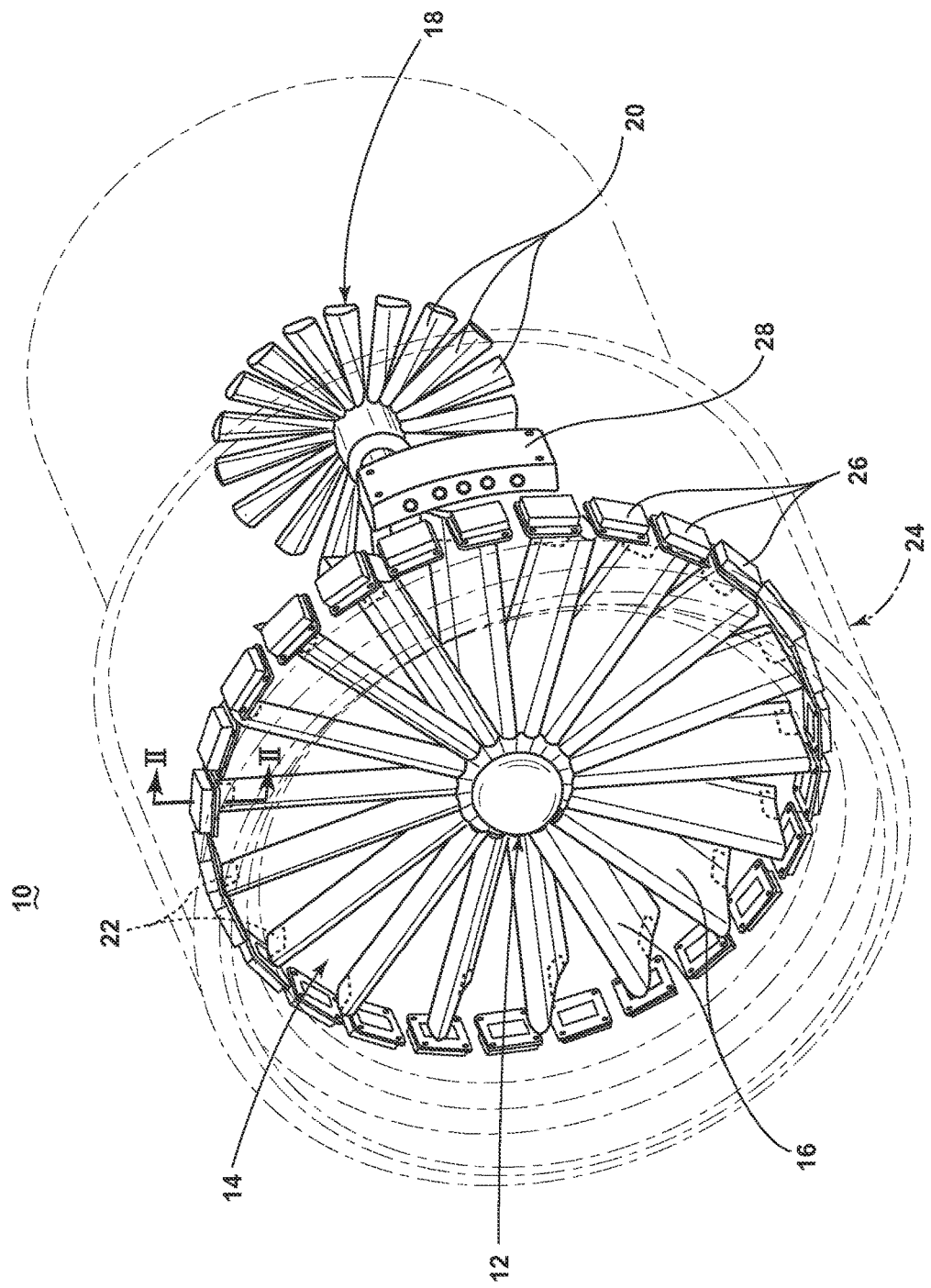
FIG. 1 is a perspective view of a turbofan engine in accordance with one embodiment of the invention.

FIG. 1 is a perspective view of a turbofan engine 10 for an aircraft as an example of the environment where embodiments of the invention will prove advantageous. The engine 10 comprises, in downstream serial flow relationship, a drive shaft 12 comprising a rotatable fan, such as a low pressure (LP) fan section 14 having a plurality of LP fan blades 16, and a low pressure (LP) turbine section 18 having a plurality of LP turbine blades 20. The drive shaft 12 is supported by engine 10 elements allowing for rotation, such as spaced bearings (not shown). The engine 10 further comprises a nacelle 24, illustrated as a dotted outline, surrounding each set of fan and turbine blades 16, 20, and axially extends at least a portion of the length of the engine 10.

A generator is integrally formed with the jet engine by using the rotational elements, such as the drive shaft 12 and LP fan section 16, to form the rotor of the generator and the stationary components, such as the nacelle 24, to form the stator. More specifically, as illustrated, each LP fan blade 16 further comprises a rotor assembly 22 integrated within the radial tip of each blade 16. Although the rotor assembly 22 is described as integrated within the radial tip of each blade 16, it is envisioned alternate fastening of the assembly 22 to the blade 16 may be employed, such as mechanical fastenings, adhesives, etc. The nacelle 24 further includes a plurality of stator assemblies 26 that are fixedly located within the nacelle 24, spaced about the nacelle 24, axially aligned along the rotational path of the rotor assemblies 22 of the LP fan blades 16.

The drive shaft 12 is configured for rotation relative to the nacelle 24 such that the rotational path of the rotor assemblies 22 axially aligns with the fixed stator assemblies 26. The nacelle 24 additionally includes a generator control unit (GCU) 28, fixedly located within the nacelle 24. The stator assemblies 26 and GCU 28 may be integrated within the nacelle 24, or they may employ alternate fastening to the nacelle 24, such as mechanical fastenings, adhesives, etc. The stator assemblies 26 may be arranged or grouped about the nacelle 24 in sets. Additionally, the GCU 28 may be alternatively located in another portion of the engine 10, nacelle 24, or aircraft, as needed.

Figure 2:
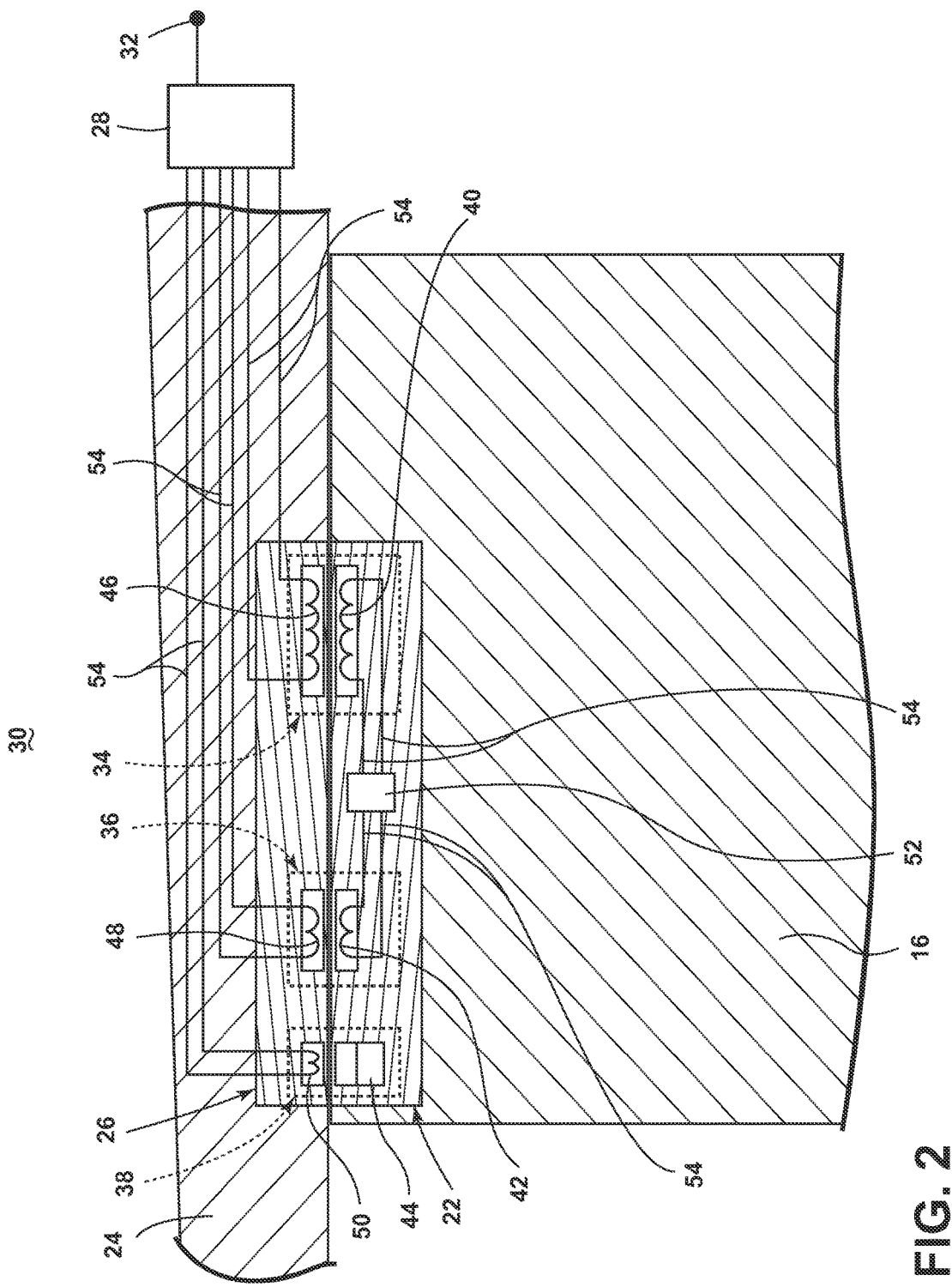
FIG. 2 is a partial sectional view taken along line 2-2 of FIG. 1 showing the stator and rotor assemblies in accordance with one embodiment of the invention.

FIG. 2 illustrates a partial sectional view taken along line 2-2 of FIG. 1 showing the generator 30, as well as the rotor and stator assemblies 22, 26 in accordance with one embodiment of the invention. It should be understood that although FIG. 2 illustrates only a single interaction between a rotor assembly 22 and stator assembly 26, the term "generator 30", as used in FIG. 2 and henceforth refers to the collective interactions of all rotor and stator assemblies 22, 26.

The generator 30 comprises a main machine 34, an exciter 36 and a permanent magnet generator (PMG) 38. The rotor assembly 22 comprises the main rotor 40, exciter rotor 42, and PMG rotor 44. The stator assembly 26 comprises the corresponding main stator 46, exciter stator 48, and PMG stator 50. The PMG rotor 44 is shown having a permanent magnet with at least two poles. The PMG stator 50 is electromagnetically aligned with the PMG rotor 44 and comprises windings arranged to provide for a single phase output along conductors 54 which are supplied to the GCU 28. Although the PMG 38 is illustrated, it is understood the PMG 38 is an optional component. For instance, embodiments of the invention are envisioned without the optional PMG 38, wherein a alternate energizing source, such as a battery, provides an output along conductors 54 which is supplied to the GCU 28.

The exciter stator 48 comprises windings electrically coupled, via conductors 54, to the GCU 28 and is electromagnetically aligned with the exciter rotor 42. The exciter rotor 42 comprises windings arranged to provide for a single phase output electrically coupled with a rectifier 52, said coupling via conductors 54. One example of the rectifier 52 may be a diode-based rectifier, rectifying the single phase input to a DC output.

The main stator 46 comprises windings arranged to electrically couple with the GCU 28 via conductors 54, and is electromagnetically aligned with the main rotor 40. The main rotor 40 comprises windings for receiving the DC output of the rectifier 52 via conductors 54.

The GCU 28 is electronically coupled to each stator assembly 26 of the generator 30 and operably configured to electronically switch current from one or more PMG stators 50 to one or more exciter stators 48 or sets of exciter stators 48. In this sense, the GCU 28 is able to control the generation of electricity in the current embodiments by controlling the excitation of the main machine 34 by selectively supplying electricity to the windings of the exciter stators 48. Additionally, while each individual rotor and stator assembly 22, 26 interaction may only generate a single phase or pulse within at the windings of the PMG stator 50, the cumulative effect of all rotor and stator assemblies 22, 26 interactions may combine to produce three or multi-phase at the GCU 28. For instance, individual rotor and stator assemblies 22, 26 may only be generating electricity from the PMG 44 interaction, but may not be generating electricity in the main machine 34, or vice versa. The selective electronic switching may be variable, based upon the speed of the rotating drive shaft 12, the desired voltage or frequency generation, or timed based on the interaction between the rotor and stator assemblies 22, 26. The GCU 28 may further have a rectifier (not shown) to rectify current received by the PMG stator 50 or the main stator 46, if a DC output is desired.

At least one voltage output is provided on the exterior of the generator 30 to provide for the transfer of electrical power to and from the generator 30. This power connection, as illustrated, is received from the GCU 28 and transmitted to a generator output 32 and may provide for at least one of alternating current, multi-phase, and constant voltage output, with a ground reference from the generator 30. The generator 30 may additionally generate electrical power at predetermined frequency, such as a constant frequency or a variable frequency within predetermined limits. One example of generated electricity comprises three-phase 115 VAC at 400 Hz. Alternate generated phases, currents, and voltages are envisioned.

In operation, the combustion of the turbofan engine 10 drives the LP turbine 18, which in turn rotates the drive shaft 12, causing the LP fan sections 14 to generate thrust. This additionally rotates each LP fan blade 16 having a rotor assembly 22 along its rotational path such that each interaction with the radially spaced stator assemblies 26 acts as a generator 30 for generating electricity. In this sense, the drive shaft 12 provides a direct source of axial rotation from the variable-speed engine 10 such that the speed of the drive shaft 12, and thus the LP fan blades 16 vary with the speed of the engine 10.

Specifically, the rotating PMG rotor 44 generates a single phase output in the windings of the PMG stator 50, supplying power to the GCU 28. The GCU 28 selectively energizes the target windings of the exciter stator 48 to create a magnetic field. The rotation of the exciter rotor 42 generates a single phase power, which is converted to DC power by the rectifier 52 and supplied to the windings of the main rotor 40. The main rotor 40 rotates relative to the main machine stator 58, generating a single phase power output received by the GCU 28, which may further summate the total electrical power generated by all the rotor and stator assemblies 22, 26, and supplies the generated power to the generator output 32, and thus to the aircraft. Depending on the type of electrical loads drawing power, the power generated by each rotor and stator assembly 22, 26 may undergo further processing before being used by the loads. For instance, the GCU 28 may summate the electricity generated by particular sets or groups of rotor and stator assemblies 22, 26 for each phase of generated power, or the GCU 28 may alter the frequency or transform the voltage of the generated power to desired or predetermined characteristics. In one example, the summated electricity is generated at 115 VAC at 400 Hz.

FIG. 3 illustrates an alternative starter/generator (S/G) 130 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the S/G 130 of the second embodiment provides starting capabilities to initiate drive shaft 12 rotations to start the engine 10 or electricity generation in the S/G 130.

The GCU 28 is arranged to electronically couple with a starting control switch 168 having a first position, and a second position, wherein the stator GCU 28 is connected to an external power source, such as a single-phase starter drive 170, allowing the power to be passed through the GCU 28 to the windings in the exciter stator 48 when the switch is in the first position, and wherein the GCU 28 is disconnected from the single-phase starter drive 170 when the switch is in the second position.

The starter drive 170 comprises a power source 172 and a controller 174 capable of regulating the frequency of the starter drive 170 power output. Examples of internal and external power sources are envisioned, including the power output of another running engine, a common three phase wall plug, or even a direct current (DC) source. In this embodiment, either the GCU 28 or the controller 174 may selectively control which stator assemblies 26 receive power from the starter drive 170 when the switch is in the first position.

In this embodiment, the engine 10 and/or the S/G 130 operates in two distinct modes: a starting mode and a running mode, wherein the starting mode operates to provide starting torque and acceleration of the drive shaft 12 and the running mode operates as a typical generator, such as in the first embodiment. At the start of the starting mode, the drive shaft 12 is not rotating and the control switch 168 is in the first position to receive power input from the starter drive 170 to the windings of the exciter stator 48.

From this condition, the power input from the starter drive 170 generates a rotating magnetic field by selectively applying the power to the windings of the exciter stators 48 in particular stator assemblies 26 in a dynamically developed or predetermined sequence. The power selectively applied to the windings in the exciter stators 48 in turn induce current on the windings of the exciter rotors 42. The ensuing induced current generates sufficient torque upon the exciter rotor 42 and LP fan blade 16 to begin rotation of the attached drive shaft 12.

Once the drive shaft 12 reaches an operable engine 10 frequency or the S/G 130 reaches an operable power generation frequency, the mode changes from starting mode to running mode. At the time of this mode change, the starting control switch 168 toggles from the first position to the second position, and the S/G 130 begins operating like the generator 30 of the first embodiment.

Many other possible embodiments and configurations in addition to that shown in the above figures are contemplated by the present disclosure. For example, although each LP fan blade 16 is illustrated having an integrated rotor assembly 22, it is envisioned that fewer blades 16 may have integrated rotor assemblies 22. For instance, embodiments are envisioned that have integrated rotor assemblies 22 in every other LP fan blade 16, every third blade 16, or only in a single blade 16. Furthermore, embodiments of the current invention envision having multiple rotor assemblies 22 located in a single LP fan blade 16, as well as embodiments wherein all of the rotor assemblies 22 are located in different blades.

Additionally, although the nacelle 24 is shown encircling both the fan and turbine blades 16, 20 sets, it is envisioned that alternate embodiments may only encircle a partial radial segment of either the engine 10 or blades 16, 20. Correspondingly, stator assemblies 26 may only encircle a partial radial segment of either the engine 10 or blades 16, 20. Another example of alternative embodiments provide for a number of stator assemblies 26 equal to the number of rotor assemblies 22, and may be arranged where the rotational interaction between the assemblies 22, 26 is simultaneous or may be offset, for instance, in sets of assemblies 22, 26.

Moreover, embodiments of the current invention are envisioned wherein the LP turbine blades 20 have rotor assemblies 22 at least partially encircled by stator assemblies 26 in addition to, or instead of the embodiments described above. Any above-described embodiments of the organization of the rotor assemblies 22, stator assemblies 26, groupings, and electricity generation are envisioned to apply to LP turbine blade 20 embodiments. Furthermore, configuration of alternate stator assembly 26 sets may allow for generation of more than one three-phase output.

In yet another embodiment of the current invention, the rectifiers 52 in each rotor assembly 22 may be collectively replaced by a more robust rectifier at the drive shaft 12, such as a diode-based rotating rectifier. In these embodiments, a single phase power generated at each exciter rotor 42, or a collected multi-phase power generated by multiple exciter rotors 42 may be summated in the drive shaft 12 and supplied to all main rotors 40, or selectively supplied to one or many main rotors 40 according to the above-described embodiments.

In yet a further example of the S/G 130 embodiments, the power source 172 may alternately apply a starting current, via the GCU 28, to the windings of the main stator 46 to generate a starting torque on the main rotor 40, and thus the drive shaft 12. In yet another embodiment of the S/G 130, the power source 172 may additionally operate in a starting mode while the engine is operating during flight in order to provide additional rotational torque in, for example, the LP fan section 14, generating additional thrust in a hybrid propulsion system. Additionally, the design and placement of the various components may be rearranged such that a number of different in-line configurations could be realized.

The embodiments disclosed herein provide an engine with an integrated generator. One advantage that may be realized in the above embodiments is that the above described embodiments replace or reduce the need for typical aircraft generator systems and removes the associated mechanical connections required to link the high or low pressure engine shafts to the generators. Additionally, the efficiency of the generator is improved because of the length of the LP fan blades, which produces a higher level of torque. Efficiency is further improved due to the high speed of the blades during operation, which generate an extremely high rate-of-change in the magnetic field.

Another advantage of the above described embodiments also remove or reduce the need for stator cooling since stator assemblies are individually low powered, and dispersed around the entire fan case. Furthermore, this area of the engine is cooled by the large volume of air drawn in by the LP fan, and experiences ambient air temperatures throughout all phases of flight, for example, −50 degrees Celsius during cruise altitude. The described embodiments may additionally reduce or remove the need for cowling anti-icing equipment due to the levels of heat generated by the stator assemblies or other included components.

In yet another advantage of the above described embodiments, the design is also highly redundant, since each stator assembly is a self-contained unit, operating in isolation from all other stator assemblies. Should one stator assembly fail, the generator will continue to operate due to the remaining stator assemblies. Likewise, the rotor assemblies are dispersed across a plurality of fan blades, and failure of any individual fan blade or rotor assembly will not cause complete generator failure.

In even another advantage of the above described embodiments, the design further removes the requirement for a Ram Air Turbine (RAT) as the generator will continue to function due to the 'windmilling' action of the LP fan section as air flows through the engine, even if the engine combustor ceases to operate.

In yet another advantage of the above described embodiments, in a hybrid engine where sufficient electrical power is being generated on board (such as with a fuel cell) the embodiments can be used to produce thrust when the kerosene fuelled combustion engine has failed. Alternatively, in a hybrid engine where sufficient electrical power is being generated on board, the embodiments can provide additional thrust in combination with the combustion engine, reducing combustible fuel use.

In yet another advantage of the above described embodiments, the generator may provide starting capability for engine or generation without additional starting equipment. The technical advantages listed above reduce parts, reduce maintenance, increase redundancy, and increase reliability of the engine and generator systems.

When designing aircraft components, important factors to address are size, weight, and reliability. The above described engine and generator systems have a decreased number of parts as the system will be able to generate electricity, making the complete system inherently more reliable. These advantages result in a lower weight, smaller sized, increased performance, and increased reliability system. The lower number of parts and reduced maintenance will lead to lower product costs and lower operating costs. Furthermore, the increased redundancy of the electricity generation inherently increases reliability of the system. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbofan engine comprising:
a turbine engine comprising a rotatable fan with a plurality of blades, wherein in a running mode the turbine engine rotates each of the plurality of fan blades;
a nacelle having a portion surrounding the blades; and
a generator comprising:
a main machine having a main rotor winding and a main stator winding;
an exciter having an exciter rotor winding and an exciter stator winding;
a rectifier electrically coupling the exciter rotor winding to the main rotor winding; and
a generator control unit (GCU) electrically coupled to the exciter stator winding and the main stator winding, and controlling the excitation of the main machine by supplying electricity to the exciter stator winding, and outputting electricity generated by the main stator winding;
wherein the main rotor winding and the exciter rotor winding define a rotor assembly that is located within at least one of the blades and proximate the nacelle, and the main stator winding and the exciter stator winding define a stator assembly that is fixedly located within the nacelle along a rotational path of the rotor assembly whereby the operation of the turbine engine rotates the fan, which rotates the rotor assembly along its rotational path past the stator assembly to generate electricity in the main stator winding.

2. The turbofan engine of claim 1 further comprising multiple rotor assemblies and at least some of the multiple rotor assemblies are located in at least one of a single blade and different blades.

3. The turbofan engine of claim 2 wherein all of the blades have the rotor assembly.

4. The turbofan engine of claim 1 further comprising multiple stator assemblies spaced about the nacelle along the rotational path.

5. The turbofan engine of claim 4 wherein the number of stator assemblies are equal to the number of rotor assemblies.

6. The turbofan engine of claim 4 wherein the stator assemblies are arranged and grouped about the nacelle to generate multi-phase electricity.

7. The turbofan engine of claim 6 wherein the GCU outputs at least one of the generated electricity and a GCU summated generated electricity from the arranged and grouped stator assemblies, at a predetermined frequency.

8. The turbofan engine of claim 7 wherein the predetermined frequency is at least one of a constant predetermined frequency and 115 VAC at 400 Hz.

9. The turbofan engine of claim 1 wherein at least one of the rotor assembly and rotatable fan comprises the rectifier.

10. The turbofan engine of claim 1 further comprising a permanent magnet generator (PMG) having a PMG stator winding forming part of the stator assembly and a PMG permanent magnet forming part of the rotor assembly.

11. The turbofan engine of claim 10 wherein the PMG stator winding is electrically coupled to, and supplies electricity to, the GCU.

12. The turbofan engine of claim 1 wherein the GCU selectively supplies electricity to energize the exciter windings.

13. The turbofan engine of claim 1 wherein each exciter rotor winding is electrically coupled with the rectifier input and each main rotor winding is electrically coupled with the rectifier output.

14. The turbofan engine of claim 1 further comprising a starter/generator comprising an AC power source to apply a starting current to at least one of the exciter stator windings and the main stator windings during a starting mode, wherein applying the starting current generates a torque that rotates the rotatable fan.

15. The turbofan engine of claim 14 wherein the starting current is applied via the GCU.

16. The turbofan engine of claim 14, wherein the mode changes from the starting mode to the running mode when the turbofan engine reaches a predetermined speed or frequency.

17. The turbofan engine of claim 1, wherein combustion of the turbine engine drive a low pressure spool of the turbine engine, which in turns rotates a drive shaft that causes the plurality of fan blades to rotate.

18. A turbofan engine comprising:
a turbine engine comprising a rotatable fan with a plurality of blades, wherein in a running mode the turbine engine rotates each of the plurality of fan blades, and wherein at least a subset of the plurality of fan blades includes a rotor assembly at the radial tip of the fan blades, the rotor assembly further comprising an exciter rotor winding, a main rotor winding, and a rectifier electrically coupling the exciter rotor winding to the main rotor winding;
a nacelle having a portion surrounding the blades and having a stator assembly fixedly located within the nacelle along a rotational path of the rotor assembly at the radial tip of the at least a subset of the fan blades, the stator assembly comprising a main stator winding and an exciter stator winding; and
a generator control unit (GCU) electrically coupled to the exciter stator winding and the main stator winding and controlling the excitation of the main machine by supplying electricity to the exciter stator winding;
whereby the operation of the turbine engine rotates the fan, which rotates the rotor assembly along its rotational path past the stator assembly to generate electricity.

19. A starter for a turbofan engine comprising:

a turbine engine comprising a rotatable fan with a plurality of blades, wherein at least a subset of the plurality of fan blades includes a rotor assembly at the radial tip of the fan blades, the rotor assembly further comprising an exciter rotor winding, a main rotor winding, and a rectifier electrically coupling the exciter rotor winding to the main rotor winding;

a nacelle having a portion surrounding the blades and having a stator assembly fixedly located within the nacelle along a rotational path of the rotor assembly at the radial tip of the at least a subset of the fan blades, the stator assembly comprising a main stator winding and an exciter stator winding; and a generator control unit (GCU) electrically coupled to the exciter stator winding, the main stator winding, and a starting power source, and configured to operate in a starting mode wherein the GCU generates a rotating magnetic field at the stator assembly that induce a current in the exciter rotor windings, generating a torque on rotor assembly at the radial tip of a subset of the plurality of fan blades sufficient to rotate the plurality of fan blades.

20. The starter of claim 19, wherein the GCU is further configured to change from the starting mode to a running mode once the rotation of the plurality of fan blades reaches an operable power generation frequency, and wherein GCU in running mode is configured to control the excitation of the main machine by supplying electricity to the exciter stator winding, whereby a combustion of the turbine engine rotates the fan, which rotates the rotor assembly along its rotational path past the stator assembly to generate electricity.

* * * * *